United States Patent
Li

(10) Patent No.: US 7,668,517 B2
(45) Date of Patent: Feb. 23, 2010

(54) RADIO FREQUENCY SIGNAL RECEIVER WITH ADEQUATE AUTOMATIC GAIN CONTROL

(75) Inventor: Tsung-Ling Li, Pingtung (TW)

(73) Assignee: Mediatek Inc., Hsin-Chu (TW)

( * ) Notice: Subject to any disclaimer, the term of this patent is extended or adjusted under 35 U.S.C. 154(b) by 460 days.

(21) Appl. No.: 11/539,227

(22) Filed: Oct. 6, 2006

(65) Prior Publication Data
US 2007/0293177 A1  Dec. 20, 2007

Related U.S. Application Data

(60) Provisional application No. 60/804,657, filed on Jun. 14, 2006.

(51) Int. Cl.
*H04B 17/02* (2006.01)
*H04B 1/06* (2006.01)
(52) U.S. Cl. .................. 455/136; 455/138; 455/239.1
(58) Field of Classification Search ............... 455/136, 455/138, 239.1, 240.1, 245.1, 250.1; 348/255, 348/470, 528
See application file for complete search history.

(56) References Cited

U.S. PATENT DOCUMENTS

| 5,548,831 | A | | 8/1996 | Bijker et al. |
| 5,715,529 | A | | 2/1998 | Kianush et al. |
| 6,324,230 | B1 | * | 11/2001 | Graham et al. ............. 375/345 |
| 6,408,168 | B1 | * | 6/2002 | Sessink .................... 455/250.1 |
| 6,670,901 | B2 | * | 12/2003 | Brueske et al. ............. 341/139 |
| 6,862,827 | B2 | | 3/2005 | Gregory |
| 7,091,792 | B2 | * | 8/2006 | Mehr ......................... 330/305 |
| 7,095,994 | B1 | * | 8/2006 | Aytur et al. ............. 455/234.1 |
| 7,248,847 | B2 | * | 7/2007 | Wallace et al. ........... 455/232.1 |
| 7,271,852 | B2 | * | 9/2007 | Paik et al. .................... 348/725 |
| 2004/0053585 | A1 | | 3/2004 | Kasperkovitz |
| 2004/0097208 | A1 | | 5/2004 | Kasperkovitz |

\* cited by examiner

*Primary Examiner*—Sonny Trinh
(74) *Attorney, Agent, or Firm*—Thomas, Kayden, Horstemeyer & Risley

(57) ABSTRACT

The invention provides a radio frequency signal receiver with adequate gain control path to control the gain of a mixer and/or a channel selection filter, comprising a low noise amplifier for receiving and amplifying a radio frequency signal, a local oscillator (LO) for providing a LO signal, a mixer for down converting the radio frequency signal by the LO signal to an intermediate signal, a channel selection filter for receiving and filtering the intermediate signal to develop an output signal, and an automatic gain control unit for feedback adjusting the gain of the low noise amplifier and forward controlling the gain of the mixer and channel selection filter in accordance with the output signal of the low noise amplifier.

11 Claims, 8 Drawing Sheets

RADIO FREQUENCY SIGNAL RECEIVER WITH ADEQUATE AUTOMATIC GAIN CONTROL

This application claims the benefit of U.S. Provisional Application No. 60/804,657, filed Jun. 14, 2006.

BACKGROUND OF THE INVENTION

1. Field of the Invention

The invention relates, in general, to a radio frequency receiver and, in particular to a radio frequency signal receiver with adequate gain control for adjusting the gain of the mixer and/or the channel selection filter.

2. Description of the Related Art

In typical radio frequency receiver with IFAGC (Intermediate Frequency Automatic Gain Control), the AGC operation follows received signal strength after a filter to adjust front-end gain of the receiver. Unfortunately, the received strong adjacent—channel interference before a filter would distort the filter and subsequent stages if it is not properly attenuated at the front-end stage. Therefore, RFAGC (Radio Frequency Automatic Gain Control) is used to solve this problem. By following the strength of received signal and interference, the gain control operation of the RFAGC can adaptively track the magnitude variations of interference to avoid distortion. However, in general RFAGC gain control operation, only the gain of LNA (Low Noise Amplifier) is adjusted to attenuate interference, which would introduce a trade-off between noise figure and dynamic range. For example, if LNA gain decreases excessively, output noise floor will raise significantly, which results in noise figure degradation.

FIG. 1 is a block diagram of one embodiment of a conventional radio frequency signal receiver with IFAGC. A low noise amplifier (LNA) 11 receives and amplifies radio frequency (RF) signals. The mixer 13 down converts the amplified RF signals to in-phase (I) signals and quadrature-phase (Q) signals based on the output signal of the local oscillator (LO) 12. The channel selection filter 14 receives and filters the signals I and Q to develop the desired channel signals. The limiting amplifier 15 receives and amplifies the output signals from the channel selection filter 14. A received signal strength indicator (RSSI) module 17 further measures the signal quality of the amplified output signals and provides a RSSI value. The automatic gain control (AGC) unit 16 adjusts the gain of LNA 11 based on the RSSI value of the RSSI module 17 and feedbacks to the LNA 11. However, according to the operation of the blocks in FIG. 1, the received adjacent interference after the channel selection filter would be filtered out and would not affect the RSSI value. Thus, strong adjacent interference will distort the channel filter and generate non-linear spurs.

FIG. 2 is a block diagram of another embodiment of a conventional radio frequency signal receiver with RFAGC. Compared with the receiver in FIG. 1, the main difference is that the input signal of the AGC 16 is the output signal from LNA 11 instead of from the RSSI 17. By following the strength of received signal and interference, the gain control operation of the RFAGC can track the magnitude variations of interference at LNA output to avoid distortion in the following stage. This conventional architecture can reduce the non-linear spurs, but the unwanted impact would still occur. In FIG. 2, only the gain of LNA (Low Noise Amplifier) is adjusted to attenuate interference and to reduce the distortion, which would introduce a trade-off between the noise figure and dynamic range of the receiver. For example, if LNA gain degrades excessively, it would cause a significant rise in noise floor to deteriorate the noise figure. Please refer to FIG. 3, which is a spectrum diagram of wanted signals and adjacent channel interference after processing by LNA, mixer, channel selection filter, and AGC unit in FIG. 2. Signal represents a signal of a desired channel and Adj. represents an adjacent channel interference. In addition, S1 shows signals at the input of the LNA 11, S2 shows signals at the output of the mixer 13 and the input of the channel selection filter 14, and S3 shows signals at the output of channel selection filter 14 and the input of the limiting amplifier 15. In S1, the strength of Signal is −50 dBm, and the strength of Adj. is −30 dBm. In S2, i.e. signals Signal and Adj. have been processed by LNA 11 and mixer 13, the strength of Signal and Adj. respectively increases to −20 dBm and 0 dBm. Next, signals Signal and Adj. are processed by the channel selection filter 14 with a fixed gain 10 dB, which has insufficient dynamic range to process so strong interference well. Thus, non-linear spurs as labeled as 31 and 32 in FIG. 3 will occur. In the operation of the receiver in FIG. 2, one way to reduce the non-linear spurs is to decrease more gain of LNA 11; however, in that way, signal-to-noise ratio of the radio frequency signal receiver will deteriorate significantly.

BRIEF SUMMARY OF THE INVENTION

The invention provides a radio frequency signal receiver with adequate gain control path to adjust the gain of a mixer and/or a channel selection filter. An exemplary embodiment comprising a low noise amplifier for receiving and amplifying a radio frequency signal, a local oscillator (LO) for providing a LO signal, a mixer for down converting the radio frequency signal by the LO signal to generate an intermediate signal, a channel selection filter for receiving and filtering the intermediate signal to develop an output signal, and an automatic gain control unit for feedback adjusting the gain of the low noise amplifier and forward controlling the gain of the mixer and channel selection filter in accordance with the output signal of the low noise amplifier.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 4:
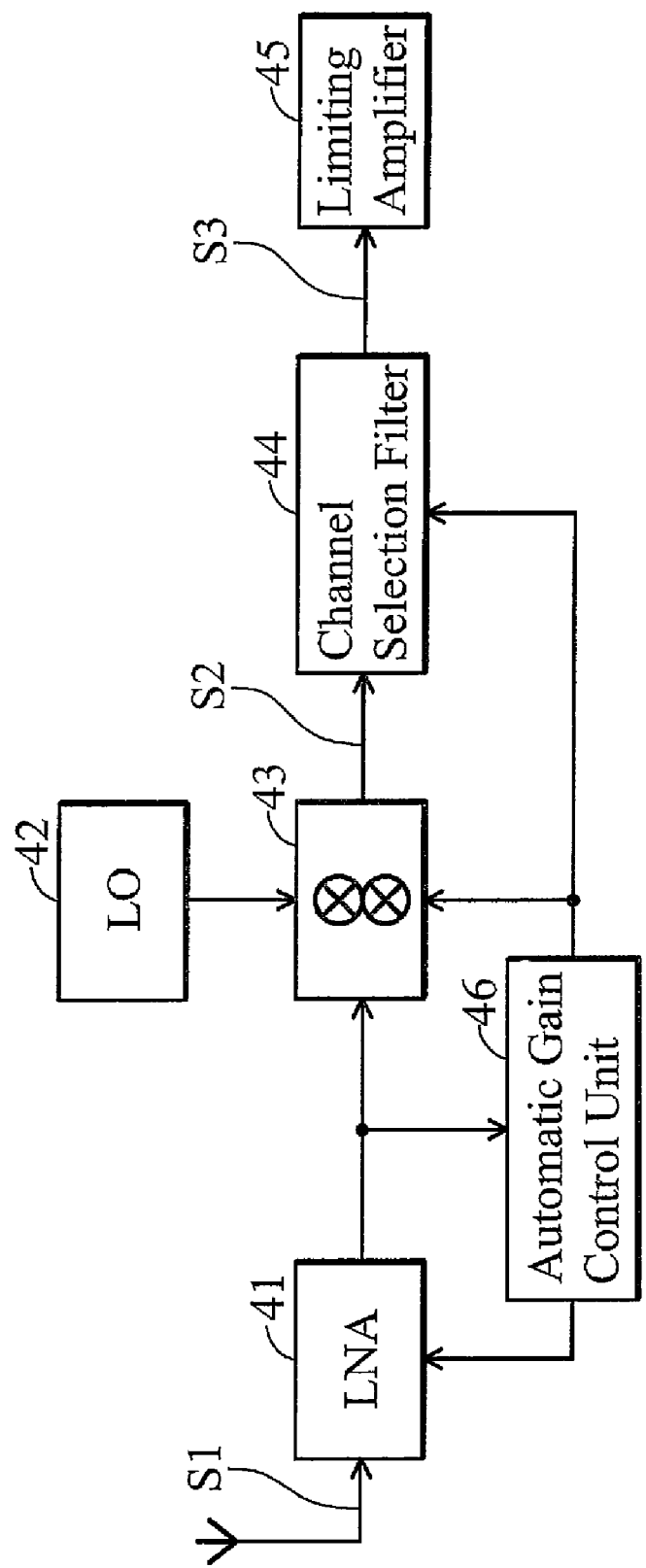
FIG. 4 is a block diagram of an embodiment of the radio frequency receiver with radio frequency automatic gain control (RFAGC) according to the invention.

FIG. 4 is a block diagram of an embodiment of the radio frequency receiver according to the invention. A low noise amplifier (LNA) 41 receives and amplifies radio frequency (RF) signals. The mixer 43 down converts the amplified RF signals to in-phase (I) signals and quadrature-phase (Q) signals based on the output signal of the local oscillator (LO) 42. The channel selection filter 44 receives and filters the signals I and Q to develop the desired channel signals. The limiting amplifier 45 receives and amplifies the output signals from the channel selection filter 44. The automatic gain control (AGC) unit 46 adjusts the gain of the LNA 41, mixer 43 and channel selection filter 44 based on the output signals of LNA 41. According to the architecture of the receiver shown in FIG. 4, the present invention provides adequate gain control for a radio frequency receiver to increase its dynamic range, which reduces non-linear spurs generated after the channel selection filter 44.

Figure 1:
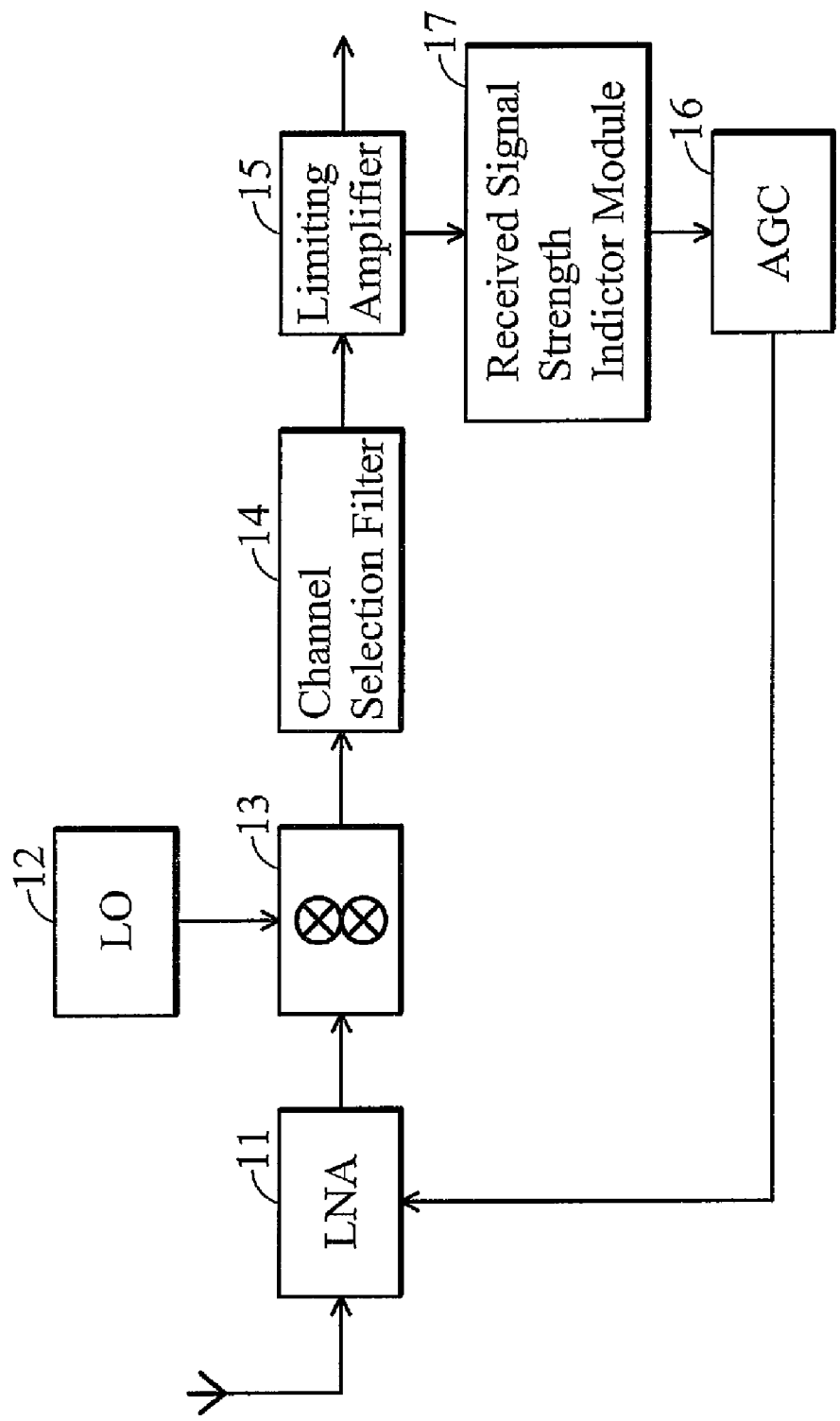
FIG. 1 is a block diagram of an embodiment of a conventional radio frequency signal receiver with intermediate frequency automatic gain control (IFAGC).
Figure 2:
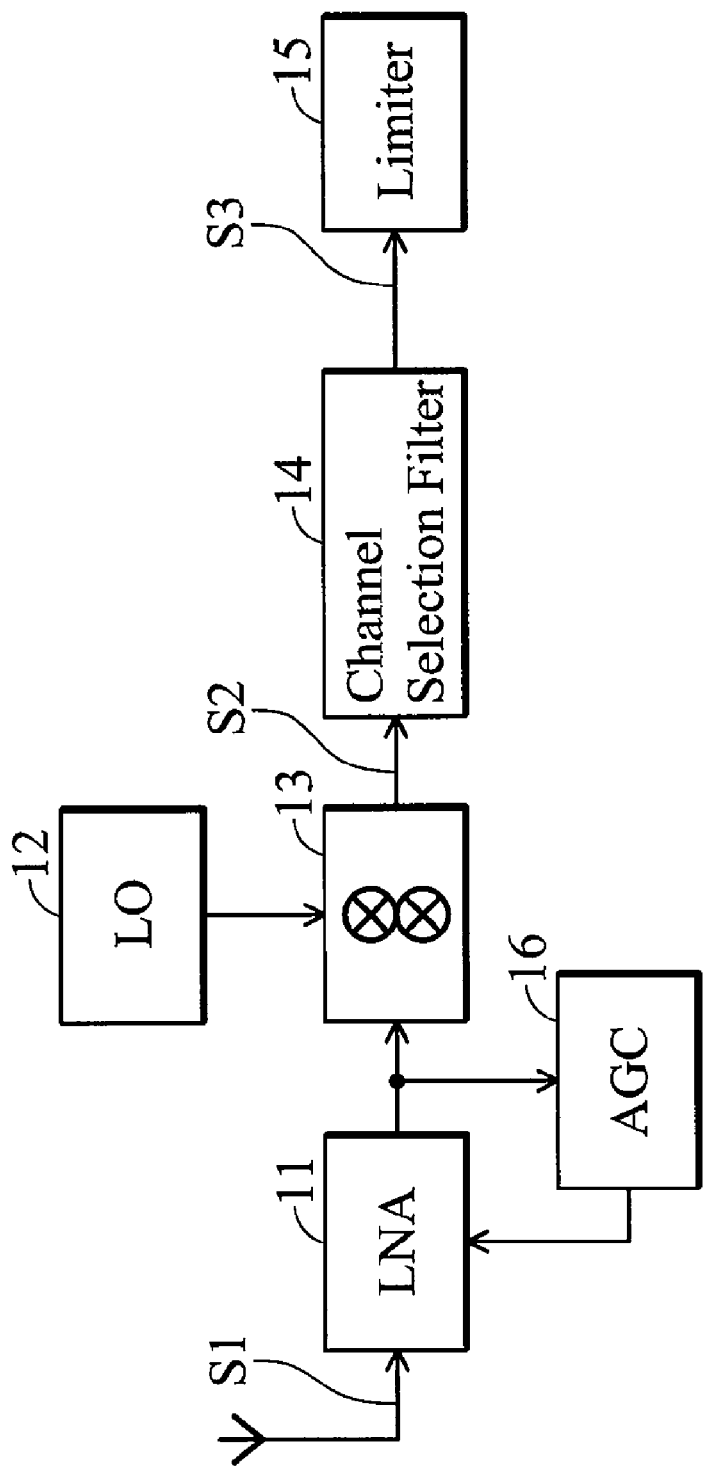
FIG. 2 is a block diagram of another embodiment of a conventional radio frequency signal receiver with radio frequency automatic gain control (RFAGC).
Figure 3:
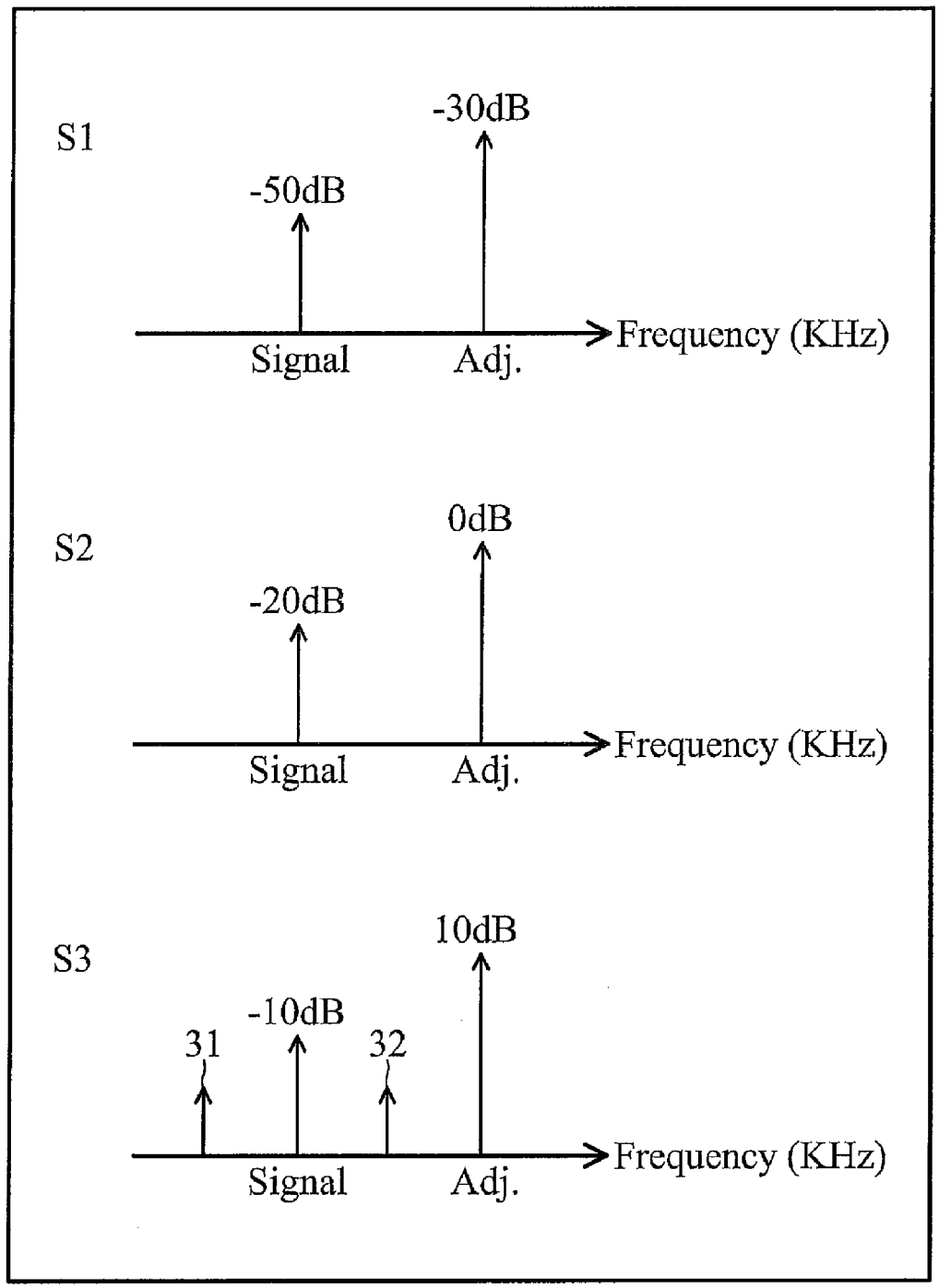
FIG. 3 is a spectrum diagram of signals after processing by LNA, mixer and channel selection filter in FIG. 2.
Figure 5:
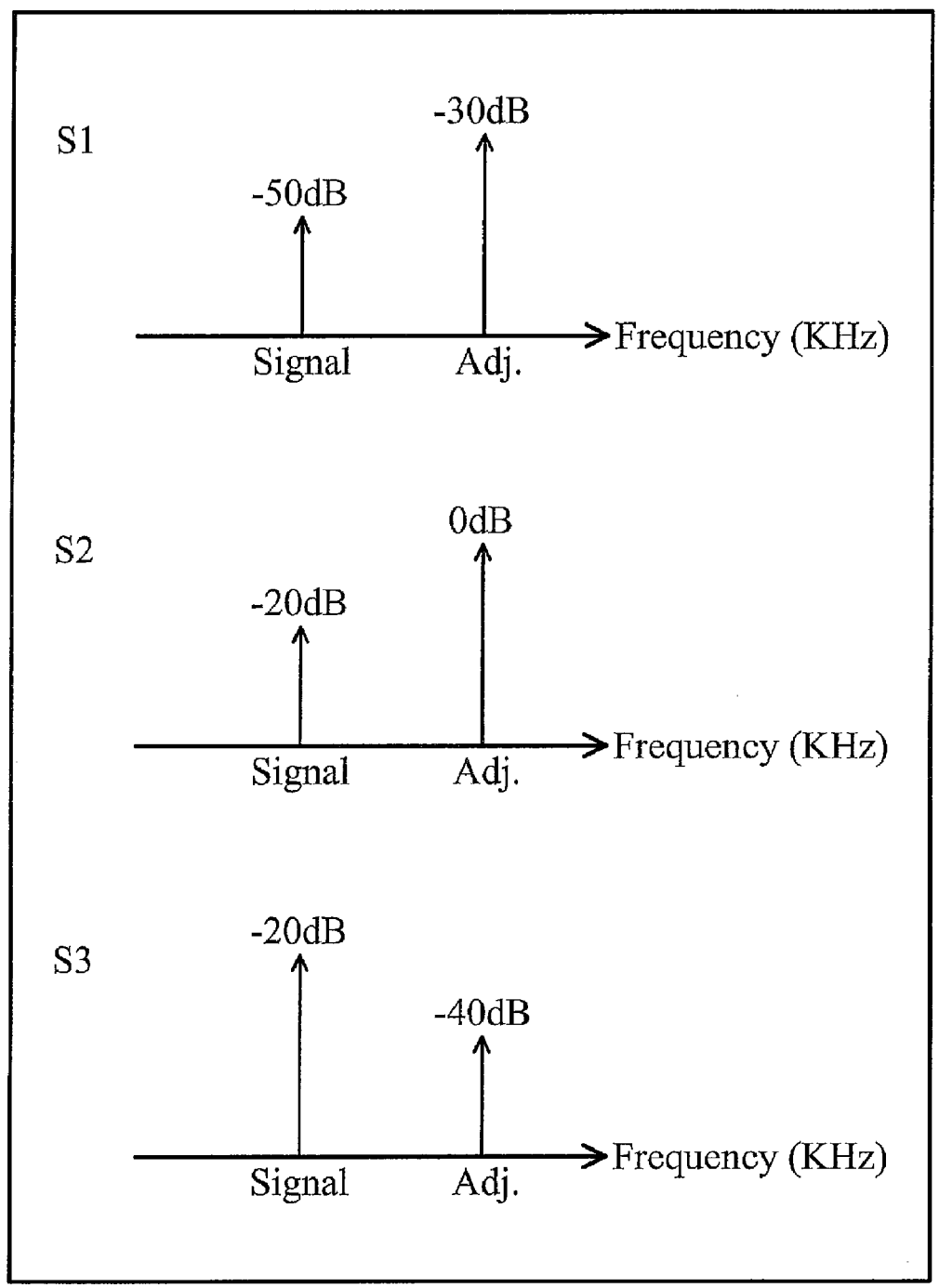
FIG. 5 is a spectrum diagram of signals after processing by LNA, mixer and channel selection filter in FIG. 4.

Please refer to FIG. 5 for further illustration. FIG. 5 is a spectrum diagram signals processed by LNA, mixer, channel selection filter, and AGC unit in FIG. 4. In S1, the strength of Signal is −50 dBm, and the strength of Adj. is −30 dBm. In S2, i.e. signals Signal and Adj. has been processed by LNA 41 and mixer 43, the strength of Signal and Adj. respectively increases to −20 dBm and 0 dBm. In the following, signals Signal and Adj. are processed by the channel selection filter 44 with an adaptive gain from 10 dB to 0 dB, which possess wider dynamic range of the channel selection filter 44 about 10 dB compared with the channel selection filter 14. Therefore, the AGC unit 46 is able to adjust the gain of the channel selection filter 44 to prevent from generating strong non-linear spurs. Comparing S3 of FIG. 5 and the S3 in FIG. 3, the non-linear spurs are negligible due to the adequate dynamic range of channel selection filter 44.

Figure 6:
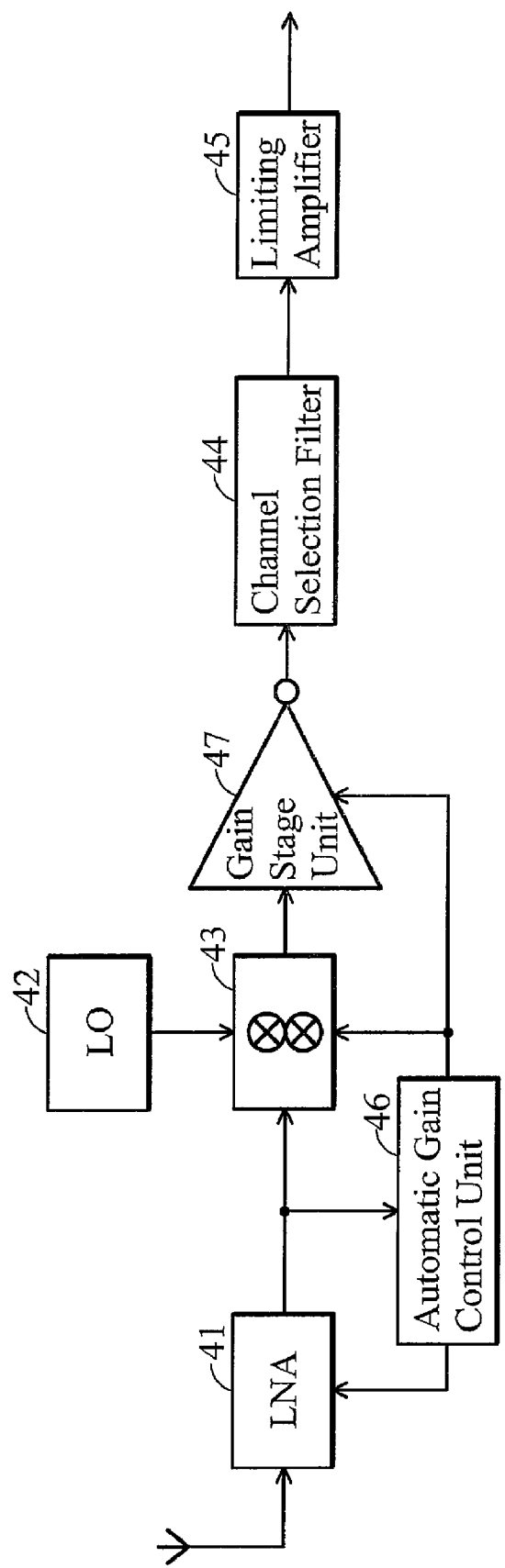
FIG. 6 is a block diagram of yet another embodiment of the radio frequency receiver with radio frequency automatic gain control (RFAGC) according to the invention.

FIG. 6 is a block diagram of yet another embodiment of the radio frequency receiver according to the invention. A low noise amplifier (LNA) 41 receives and amplifies radio frequency (RF) signals. The mixer 43 down converts the amplified RF signals to in-phase (I) signals and quadrature-phase (Q) signals based on the output signal of the local oscillator (LO) 42. The channel selection filter 44 receives and filters the signals I and Q to develop the desired channel signals. The limiting amplifier 45 receives and amplifies the output signals from the channel selection filter 44. A gain stage unit 47, which could be an operation amplifier, amplifies the signals I and Q based on the gain control from the channel selection filter 44. The channel selection filter 44 receives and filters the signals to output the desired channel signals. The automatic gain control (AGC) unit 46 adjusts the gain of the LNA 41, mixer 43 and gain stage unit 47 based on the output signals of LNA 41. According to the architecture of the receiver shown in FIG. 6, the present invention provides adequate gain control for a radio frequency receiver to increase its dynamic range, which reduces non-linear spurs generated after the channel selection filter 44.

Figure 7:
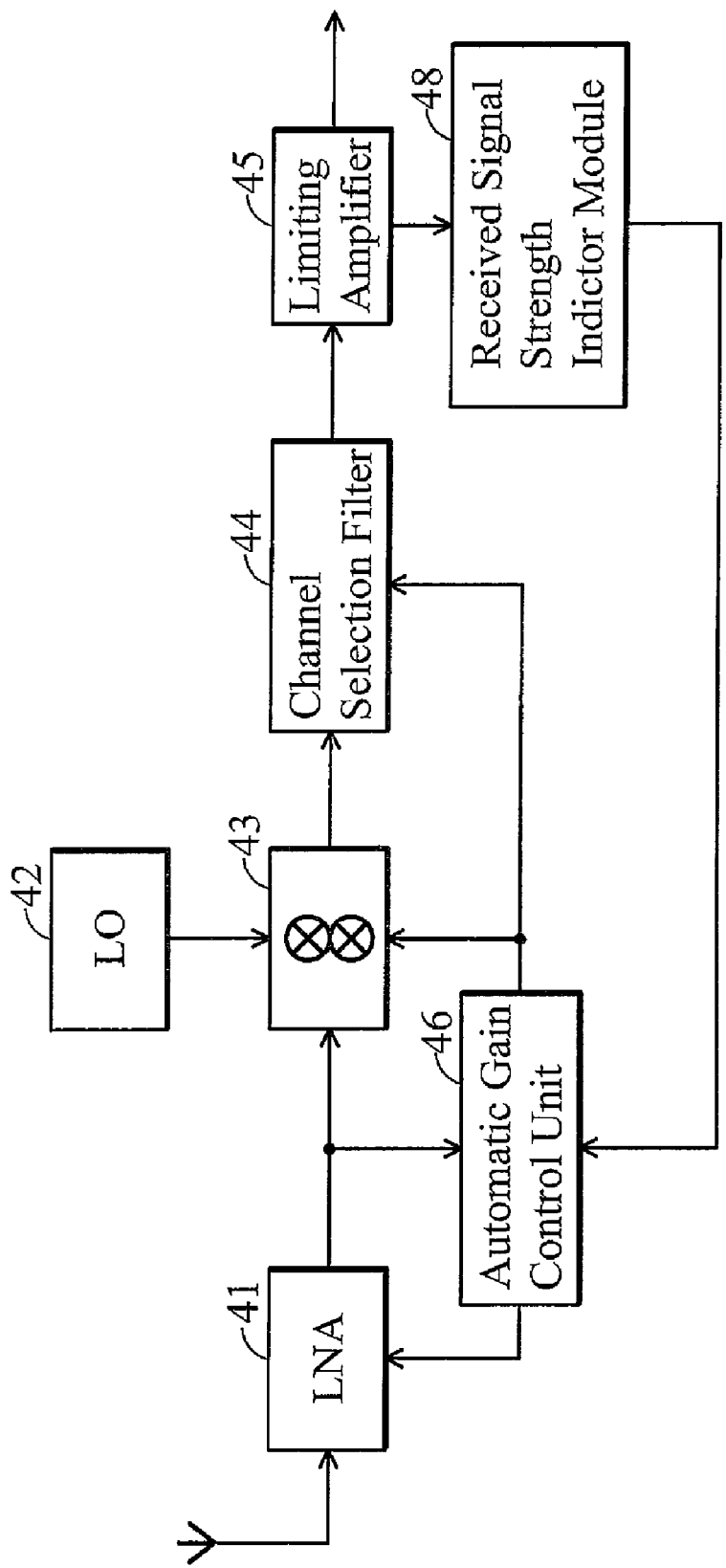
FIG. 7 is a block diagram of another embodiment of the radio frequency receiver with radio frequency automatic gain control (RFAGC) according to the invention.

FIG. 7 is a block diagram of yet another embodiment of the radio frequency receiver according to the invention. The low noise amplifier (LNA) 41 receives and amplifies radio frequency (RF) signals. The mixer 43 down converts the amplified RF signals to in-phase (I) signals and quadrature-phase (Q) signals based on the output signal of the local oscillator (LO) 42. The channel selection filter 44 receives and filters the signals I and Q to develop the desired channel signals. The limiting amplifier 45 receives and amplifies the output signals from the channel selection filter 44. The received signal strength indicator (RSSI) module 48 generates a RSSI value according to the amplified output signal from the limiting amplifier 45, and further outputs a turn-on signal according to the RSSI value to activate the AGC unit 46 when the strength of the output signal exceeds a first predetermined strength, and a turn-off signal to disable the AGC unit 46 when the strength of the output signal is below a second predetermined strength. In this embodiment, the present architecture can avoid continuous switching on/off at the AGC unit 46. The turn-on and turn-off signals can be generated by any hardware and/or software control method implemented in the RSSI module 48. When the AGC unit 46 turns on in response to the received turn-on signal, the AGC unit 46 adjusts the gain of the LNA 41, mixer 43 and channel selection filter 44 based on the output signals of LNA 41. According to the architecture of the receiver shown in FIG. 7, the present invention provides adequate gain control for a radio frequency receiver to increase its dynamic range, which reduces non-linear spurs generated after the channel selection filter 44.

Figure 8:
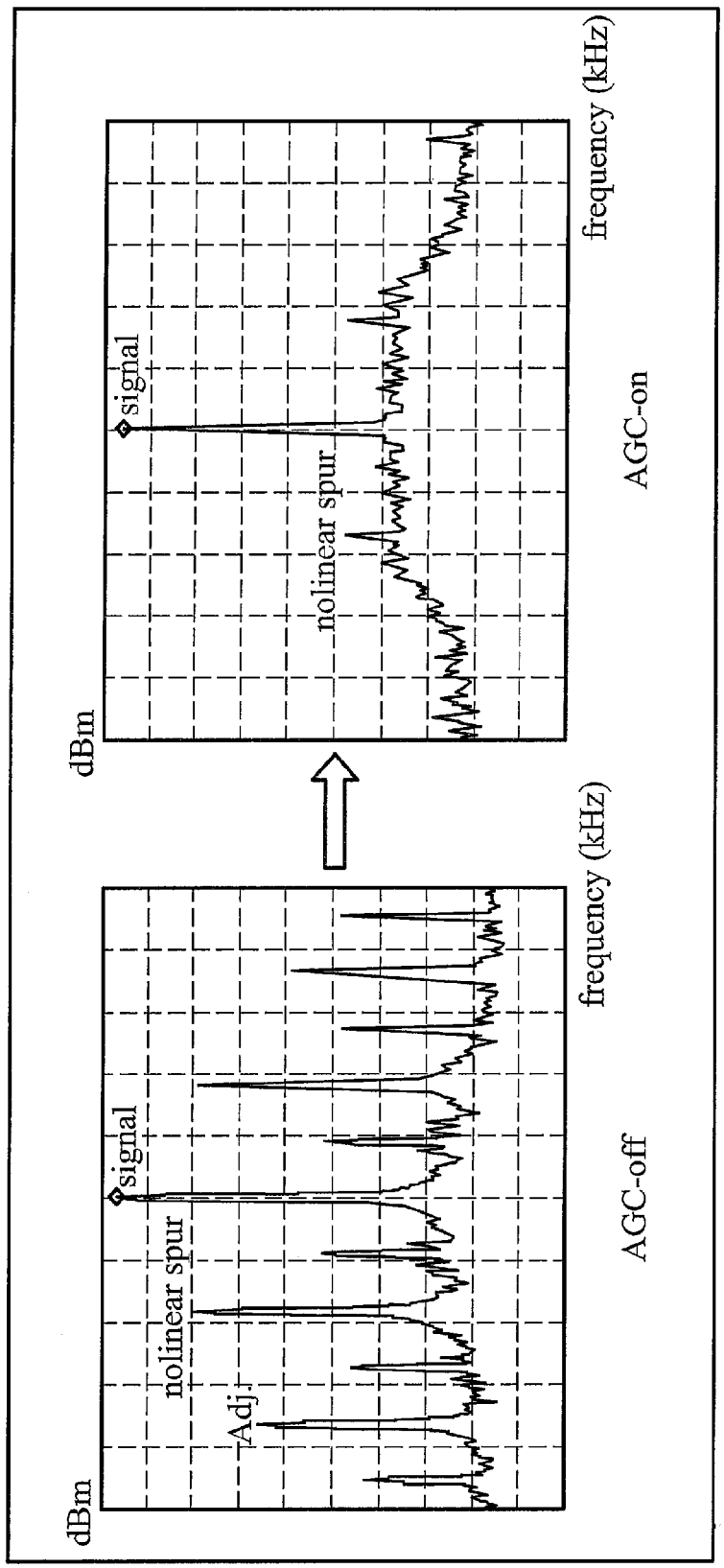
FIG. 8 is a signal spectrum diagram showing the output signal when the AGC unit is enabled and is disabled.

FIG. 8 is a signal spectrum diagram showing the output spectrum when the AGC unit is enabled (AGC-on) and disabled (AGC-off). When the AGC unit 46 of the present invention is disabled, the non-linear spurs caused by the adjacent channel interference will reduce the quality of the desired channel signal. When the AGC unit 46 of the present invention is enabled, the strength of the non-linear spurs and the adjacent channel interference decrease significantly, so the quality of the desired channel signal and the performance of the receiver will be improved.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A radio frequency (RF) receiver, comprising:
a low noise amplifier (LNA) for receiving and amplifying the radio frequency signal;
a local oscillator for supplying a first local oscillator signal;
a mixer, coupled to the LNA and the local oscillator, for generating a first intermediate frequency signal in response to the amplified radio frequency signal and the first local oscillator signal;
a filter, coupled to the mixer, for filtering the first intermediate frequency signal to develop a first output signal;
a first amplifier for amplifying the first output signal;
a received signal strength indicator (RSSI) module, coupled to the first amplifier, for generating a RSSI value according to the amplified first output signal; and
an automatic gain control (AGC) unit, coupled to the LNA and a received signal strength indicator (RSSI) module, for adjusting the gain of the filter and/or the mixer according to the strength of the amplified radio frequency signal.

2. The receiver as claimed in claim 1, wherein the filter further comprises a second amplifier controlled by the automatic gain control unit for amplifying the first intermediate frequency signal.

3. The receiver as claimed in claim 1, wherein the automatic gain control unit further adjusts the gain of the low noise amplifier.

4. The receiver as claimed in claim 1, wherein the received signal strength indicator (RSSI) module further comprising a hardware or a software for outputting a turn-on or a turn-off signal according to the RSSI value to control the AGC unit, wherein when the RSSI value exceeds a first predetermined value, the hardware or software outputs the turn-on signal to enable the automatic gain control unit, and when the RSSI value is below a second predetermined value, the hardware or software outputs the turn-off signal to disable the automatic gain control unit.

5. The receiver as claimed in claim 1, wherein the first intermediate signal comprises an in-phase signal and a quadrature-phase signal.

6. The receiver as claimed in claim 1, further comprising a local oscillator (LO) for supplying the first local oscillator signal comprising an in-phase LO signal and a quadrature-phase LO signal.

7. An automatic gain control (AGC) unit, comprising:
   a first terminal receiving an input signal from a low noise amplifier, wherein the AGO unit further generates a control signal in response to the input signal; and
   a second terminal, coupled to a mixer and/or a filter, wherein the second terminal outputs a gain adjustment signal to the mixer and/or the filter to adjust the gain of the mixer and/or the filter according to the control signal.
   a third terminal coupled to a received signal strength indicator (RSSI) module, wherein the RSSI module generates a RSSI value.

8. The automatic gain control unit as claimed in claim 7, wherein the second terminal further coupled to an amplifier coupled to the filter for gain adjustment.

9. The automatic gain control unit as claimed in claim 7, further comprising:
   a fourth terminal coupled to a radio frequency amplifier for gain adjustment.

10. The automatic gain control unit as claimed in claim 7, wherein the input signal is a radio frequency signal.

11. The automatic gain control unit as claimed in claim 7, wherein the received signal strength indicator (RSSI) module further comprising a hardware or a software for outputting a turn-on or a turn-off signal to control the AGC unit according to the RSSI value, wherein when the RSSI value exceeds a first predetermined value, the hardware or software outputs the turn-on signal to enable the automatic gain control unit, and when the RSSI value is below a second predetermined value, the hardware or software outputs the turn-off signal to disable the automatic gain control unit.

* * * * *